W. H. MAIN.
TRACE-CARRIER.
No. 176,437. Patented April 25, 1876.
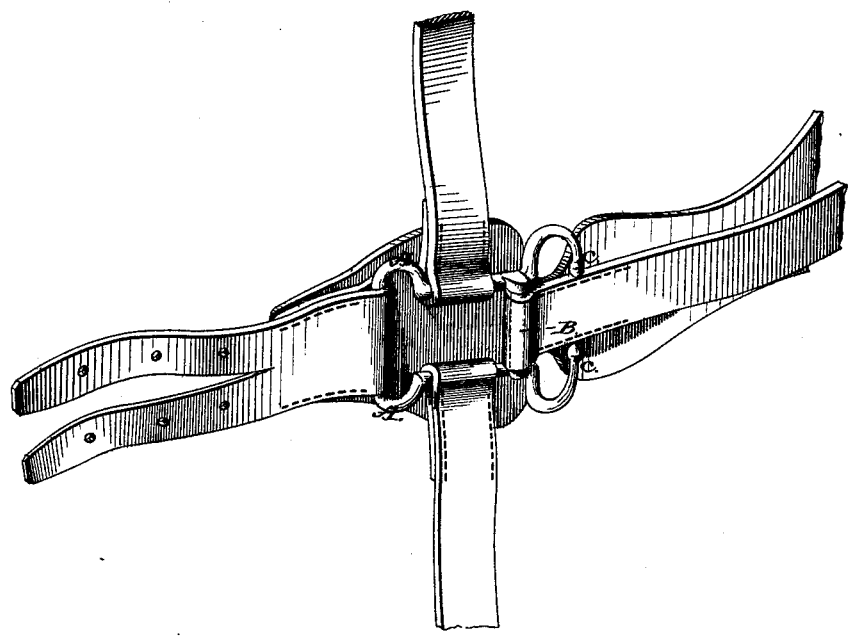

UNITED STATES PATENT OFFICE.

WILLIAM H. MAIN, OF BOSCOBEL, ASSIGNOR OF ONE-FOURTH HIS RIGHT TO HENRY S. WOODRUFF, OF JANESVILLE, WISCONSIN.

IMPROVEMENT IN TRACE-CARRIERS.

Specification forming part of Letters Patent No. 176,437, dated April 25, 1876; application filed December 27, 1875.

*To all whom it may concern:*

Be it known that I, WILLIAM H. MAIN, of Boscobel, in the county of Grant and State of Wisconsin, have invented a new and useful Improvement in Trace-Carriers, which improvement is fully set forth in the following specification, reference being had to the accompanying drawings.

The object of my invention is to construct a trace-carrier as a part of the harness, which will be simple, symmetrical in appearance, and at the same time will hold the trace firmly and securely, whether the harness is upon the horses or in any other place; and for this purpose frame A is so constructed that the four sides form the loops for crupper, hip, and back straps, with rigid hooks, as follows: The rear end of frame A, forming a loop for the crupper-strap, to be attached to the forward end of frame A, is a cross-bar, to which may be attached the back-strap B, the whole of frame A taking the place of the ring, in ordinary use, to connect the parts of the harness above mentioned. The forwards ends of the side bars of frame A are extended and curved inwardly in the form of hooks C C, the ends of which are brought just near enough together to allow the back-strap to play between them. These hooks, when so formed and adjusted with the back-strap B lying between them, are used to hitch the trace-iron into, which is done by raising the forward end of frame A, the frame A and the back-strap forming a joint, and, when lying flat, the back-strap B prevents the trace-iron from slipping out or becoming disengaged, except when back-strap B is curved downward, or hooks C C raised up for that purpose.

I do not wish to be confined to any particular form of frame, but construct it so as to receive the back, hip, and crupper straps, with rigid hooks C C, extended from the end, being a part of the same.

What I claim as my invention, and desire to secure by Letters Patent, is—

A trace-carrier, consisting of a frame, having a loop at one end and the rigid hooks C C at the other, the said loops and hooks being integral with, and in the same plane as, the side bars, and having a cross-bar uniting the side bars, and adapted to receive the back-strap, substantially in the manner and for the purpose specified.

WILLIAM H. MAIN.

Witnesses:
 H. MANSTOCK,
 M. M. PHELPS.